United States Patent [19]

Kakumoto et al.

[11] 4,105,549

[45] Aug. 8, 1978

[54] METHOD AND APPARATUS FOR PURIFICATION OF WATER

[75] Inventors: Yoshiaki Kakumoto, Chigasaki; Mamoru Kanegawa; Takashi Iwaizumi, both of Yokohama; Nobuo Matsumoto, Tokyo, all of Japan

[73] Assignee: Ebara Infilco Kabushiki Kaisha, Tokyo, Japan

[21] Appl. No.: 742,405

[22] Filed: Nov. 16, 1976

Related U.S. Application Data

[63] Continuation-in-part of Ser. No. 548,723, Feb. 10, 1975, abandoned.

[51] Int. Cl.² ............................ C02B 1/14; B01D 15/02
[52] U.S. Cl. .............................. 210/33; 210/40; 210/189; 210/279

[58] Field of Search ................. 210/33, 35, 39, 40, 210/189, 275, 279, 20

[56] References Cited

U.S. PATENT DOCUMENTS

| | | | |
|---|---|---|---|
| 2,855,364 | 10/1958 | Roberts | 210/35 |
| 3,436,343 | 4/1969 | Smith | 210/33 |
| 3,515,277 | 6/1970 | Kingsbury et al. | 210/33 |
| 3,847,805 | 11/1974 | Voedisch | 210/189 |

Primary Examiner—Charles N. Hart
Assistant Examiner—Ivars Cintins
Attorney, Agent, or Firm—Blum, Moscovitz, Friedman & Kaplan

[57] ABSTRACT

Water or waste water is purified by passing same through a packed layer of active carbon utilizing the absorbing activity of active carbon. An apparatus for practising this method is disclosed.

16 Claims, 15 Drawing Figures

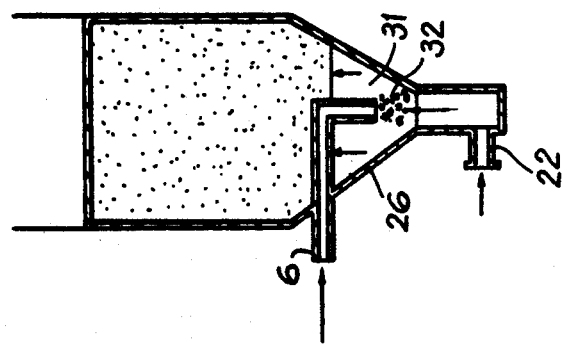
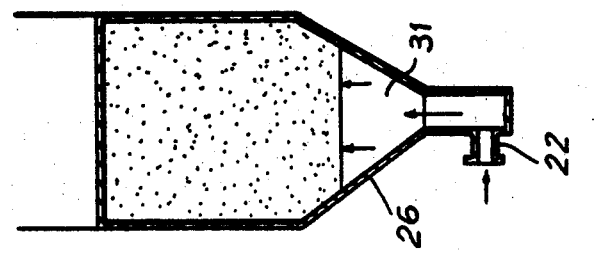
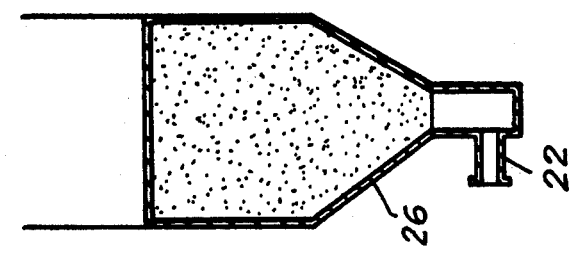

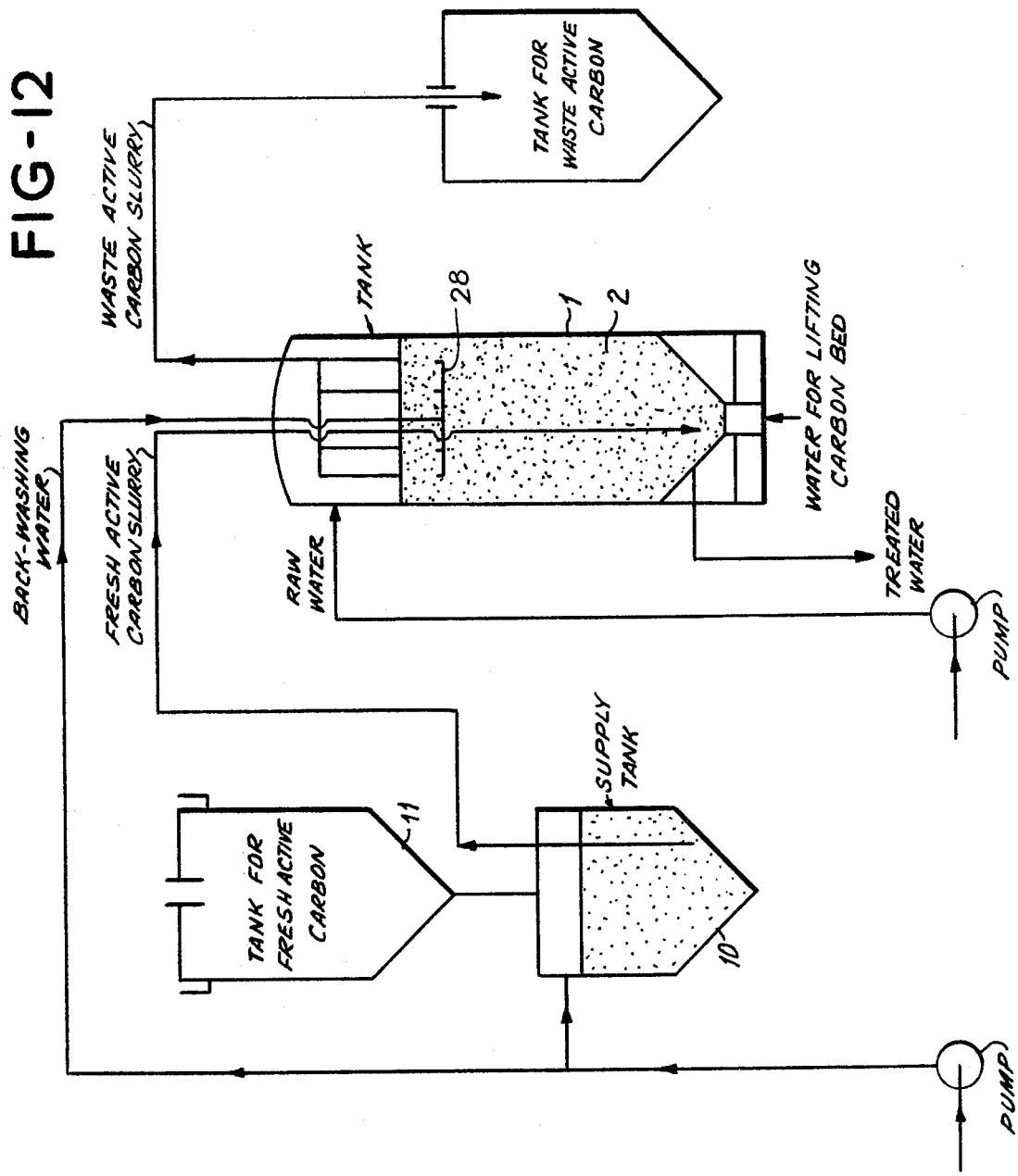

METHOD AND APPARATUS FOR PURIFICATION OF WATER

CROSS-REFERENCE TO RELATED APPLICATION

The present application is a continuation-in-part application of our co-pending application Ser. No. 548,723 for METHOD AND APPARATUS FOR PURIFICATION OF WATER, now abandoned.

BACKGROUND OF THE INVENTION

In a treatment of sewage and waste water, it is known that the adsorbing activity of active carbon is effective for removal of organic matter. The adsorptivity of the carbon may be expressed in terms of reduction of BOD (biological oxygen demand) and COD (chemical oxygen demand), as well as reduction of color and removal of mold smells, alga smells and other unpleasant smalls generated in eutrophic lakes and marshes.

Columns packed with active carbon heretofore used for the adsorption treatment of water and waste water are roughly divided into three types; the fixed bed type, the fluidized bed type and the moving bed type. In the case of the fixed bed type column, granular active carbon is contained in a vessel in the form of a layer having a thickness of 1 to 3 m, and water to be treated is passed downwardly through this layer to effect the adsorption treatment. In this method, when the used active carbon is to be regenerated, the supply of water to be treated is stopped, and all of the used active carbon is removed at one time and replaced by a batch of regenerated active carbon.

In operation by this method, jamming occurs in the active carbon layer by build-up of solids contained in small amounts in the water under treatment and passage of water becomes increasingly difficult. In this case, it is necessary to remove the solids caught in the layer, at least from the surface portion of the active carbon layer, by back-washing with water.

In the fluidized bed type column, granular active carbon is charged into a vessel, and water to be treated is passed upwardly through the vessel at a speed such that the active carbon is fluidized in the vessel. In this method, any solids in the running water pass through the fluidized layer of active carbon and hence, no jamming occurs and back-washing with water need not be performed. Further, since used active carbon is withdrawn from the bottom of the vessel and regenerated active carbon is supplied to the head of the vessel, replenishment of active carbon can be greatly facilitated. In this fluidized bed method, however, if the speed of the upward stream of water to be treated is too slow, active carbon is sedimented in the lower portion of the vessel and no fluidized bed is formed. On the other hand, if the speed of the stream is too high, the fluidized bed expands excessively, so that active carbon particles frequently fly out from the vessel and the operation becomes unstable. Accordingly, the contact time between water to be treated and active carbon cannot be freely made longer or shorter, and in this method, effective purification cannot be expected when a relatively long contact time is required, as for example, when a high content of sewage or the like is present or in the treatment for reduction of pulp waste water and the treatment for removal of COD (chemical oxygen demand).

In the moving bed type column, water to be treated is passed through a layer of active carbon contained in a vessel in the form of an upward stream, and regenerated active carbon is supplied from the head of the vessel while used active carbon is withdrawn from the bottom of the vessel. This replenishment of active carbon is performed intermittently. In this method, jamming is caused in the lower portion of the active carbon layer by solids contained in the running water and the resistance to passage of water gradually increases, resulting in stoppage of flow of water. Therefore, it is necessary to remove the solids caught in the active carbon layer by back-washing. In this case, however, the adsorption zone of active carbon is destroyed or disturbed by back-washing and hence, it becomes impossible to remove only active carbon saturated with adsorbed materials, resulting in reduction of the adsorption efficiency. Further, in this method, if the speed of the liquid is increased, the operation is made unstable because of fluidization of the active carbon layer, channelling and blow-by of the liquid and hence, the operation efficiency is drastically lowered.

SUMMARY OF THE INVENTION

In accordance with this invention, there is provided a method for purifying water or waste water fluid by passing it through a packed bed of active carbon, said method comprising:

(1) supplying said fluid to the upper side of said packed bed and allowing the fluid to flow downwardly in the packed bed;

(2) preparing a slurry of active carbon by mixing active carbon with a liquid;

(3) supplying the active carbon slurry to the lower portion of said packed bed intermittently, i.e., periodically;

(4) slurrying the upper portion of the packed bed intermittently; and (5) withdrawing active carbon slurry from the upper portion of the packed bed in an amount corresponding to the amount of the active carbon slurry supplied to the lower portion of the packed bed, whereby the active carbon constituting the packed layer is intermittently moved in the packed layer in a counter-current manner to the fluid and the active carbon is caused to have a counter-current contact with the fluid.

In accordance with this invention, there is also provided an apparatus for the purification of water or waste water fluid comprising a tank having in the interior thereof a packed bed formed of active carbon, said apparatus including in the upper portion of the tank at least one tube for flowing a fluid to be treated into the tank and at least one tube for flowing an active carbon slurry out of the tank, and in the lower portion of the tank at least one tube for flowing the treated fluid out of the tank and at least one tube for flowing an active carbon slurry into the tank. In the course of the adsorption treatment the fluid to be treated is passed through the active carbon bed downwardly. During replenishment of the bed, regenerated or fresh active carbon is introduced under pressure into the lower portion of the active carbon bed as a slurry and used active carbon present in the upper portion of the active carbon layer is discharged as a slurry together with solids and colloidal material caught thereon, whereby the efficiency of utilization of active carbon is enhanced over that of prior methods and apparatus.

Critical to the most efficient use of the apparatus is lifting of the bed as a unit, that is, in piston fashion, in preparation for adding fresh or regenerated active carbon. This piston-wise type of upward displacement of the bed is effected by injection of water beneath the bed in a defined velocity range, the upper limit of which is that above which fluidization occurs. Further, the bottom of the treatment tank must be conical.

Accordingly, an object of the present invention is a method of purification of water or waste water with high efficiency utilizing active carbon in which the carbon is moved intermittently upward against the flow of water under treatment.

A further object of the present invention is a method of treatment of water or waste water with active carbon for reduction of impurities content, chemical oxygen demand and biological oxygen demand with high efficiency wherein fresh or regenerated active carbon is introduced at the bottom of a treatment bed in the form of slurry and used active carbon is removed in the form of a slurry from the top of the bed.

An important object of the present invention is an apparatus for treatment of water or waste water with active carbon at high efficiency wherein provision is made for downward flow of water under treatment, introduction of fresh or regenerated active carbon in the bottom portion of the bed in the form of a slurry and removal of used active carbon in the form of a slurry from the top of the bed.

A significant object of the present invention is a set of design criteria and operational criteria which provide for essentially continuous counter-current contact of a fluid and a granular solid, these criteria making it possible to lift the granular solid as a unit without fluidization thereof.

Still other objects and advantages of the invention will in part be obvious and will in part be apparent from the specification.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawings, in which:

FIGS. 11a, 11b and 11c show the position of the active carbon bed during various stages of introduction of fresh carbon to the bed; and FIG. 12 is a schematic flow diagram for an apparatus in accordance with the present invention.

DESCRIPTION OF THE PREFERRED EMBODIMENTS

Figure 1:
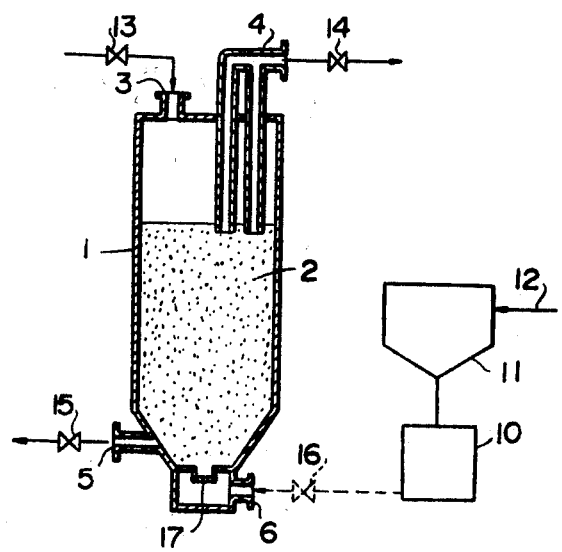
FIG. 1 is a sectional side view of one embodiment of the apparatus of this invention.

Referring to FIG. 1, a bed 2 of granular active carbon is formed in a tank 1 of a columnar form. Tank 1 is fitted at the top of same with entrance port 3 for introduction of fluid to be treated and with discharge tube 4 for removal of used active carbon as slurry from the upper portion of bed 2. Further, discharge tube 5 for efflux of treated fluid from the tank 1 and feed tube 6 for introduction of an active carbon slurry into the tank 1 are connected to the lower portion of the tank 1. It is preferred that a slurry distribution device 17 of an appropriate structure including, for example, a bypass formed in plate members (not shown), be disposed at the position adjacent the opening of the feed tube 6 for introduction of active carbon slurry into the tank 1.

The discharge tube 4 for removal of used active carbon slurry from tank 1, which is connected to the upper portion of the tank 1, terminates at its lower end in a position adjacent the active carbon layer 2 or within the upper portion of the active carbon layer. In order to remove the upper portion of the active carbon layer 2 uniformly from the tank 1, tube 4 may have a plurality of openings at its lower end. Similarly, in order to distribute the fluid uniformly in the active carbon layer 2, there may be provided a plurality of ports 5, one of which is shown, for discharging treated fluid from tank 1, these ports 5 being connected to the lower portion of tank 1.

Figure 9:
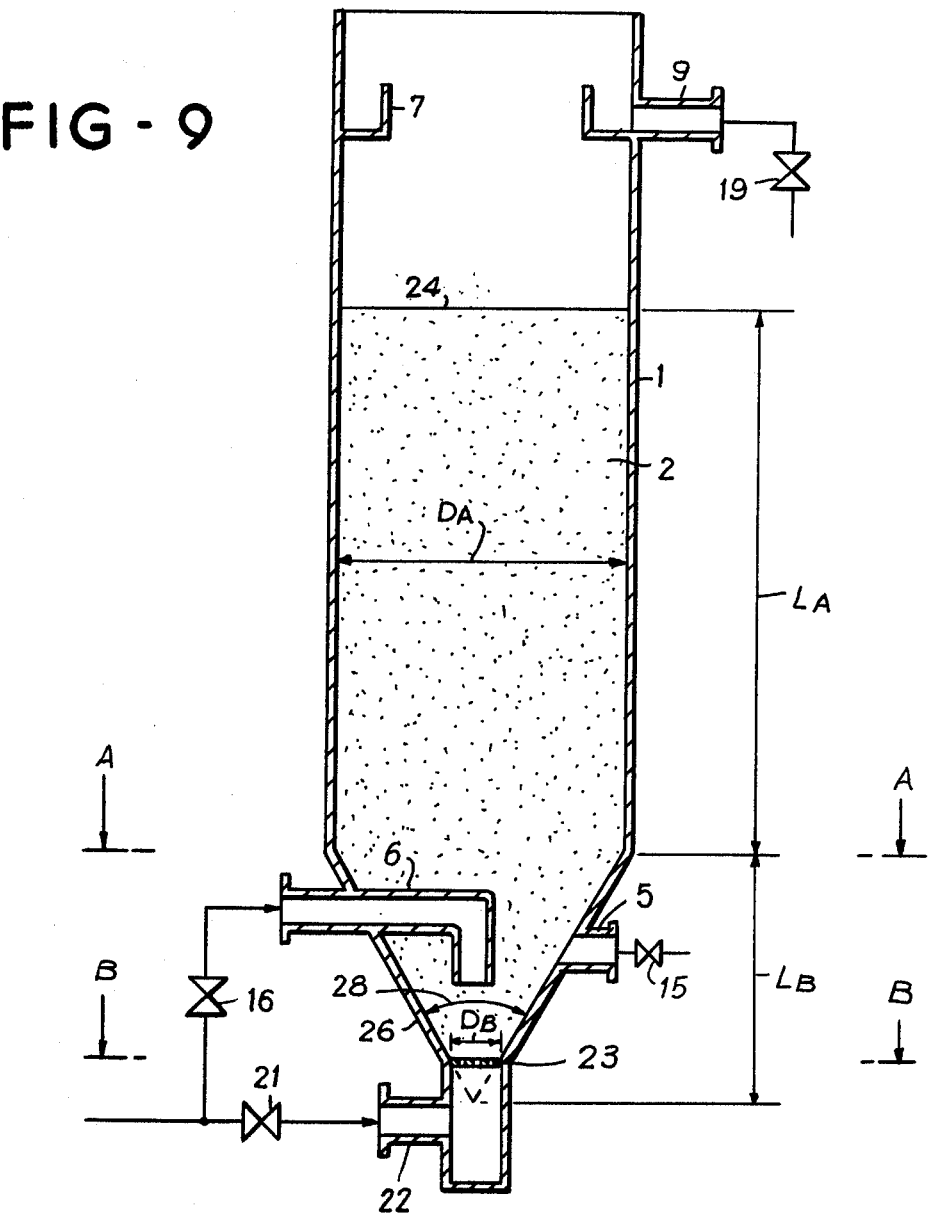
FIG. 9 is a sectional side view of an embodiment of the invention showing reference characters for use in presenting critical dimension relationships.

One end of feed tube 6 which serves for introducing active carbon slurry into the tank 1 is connected to the lower portion of tank 1 and the other end is connected to hopper 11 through an introduction device 10, so that fresh or regenerated active carbon may be introduced in the slurry state into the lower portion of the tank 1. Preferably, feed tube 6 is positioned as shown in FIG. 9 for introducing active carbon slurry directly into the frustoconical section 26 of the bed.

Figure 2:
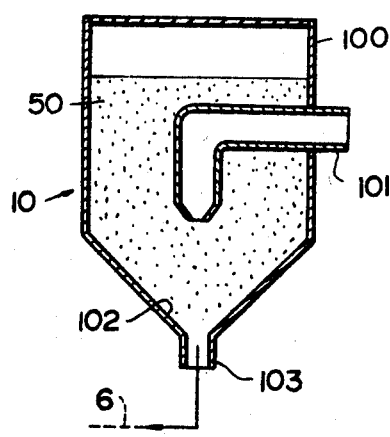
FIG. 2 is a sectional side view of a device for introducing active carbon.
Figure 3:
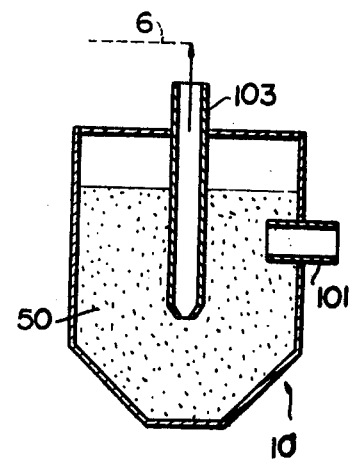
FIG. 3 is a sectional side view of another embodiment of the active carbon-introducing device.

An embodiment of a device for supplying carbon to feed tube 6 is illustrated in FIG. 2 and given the reference number 100. Pipe 101 for introduction of water under pressure is connected to tank 100 having a funnel-shaped bottom and containing active carbon 50. The fact that the water introduced through pipe 101 is under pressure makes it possible to inject the water into tank 100 at high velocity and thus to fluidize the active carbon and convert it into a slurry. This same means will be disclosed in connection with the introduction of water into tank 1. Discharge port 103 is connected to feed tube 6. Active carbon 50 is introduced under pressure in the slurry state into the lower portion of the tank 1 by the introduction device 10 when water is injected into the device at high rate. Another embodiment of the introduction device is shown in FIG. 3.

Figure 4:
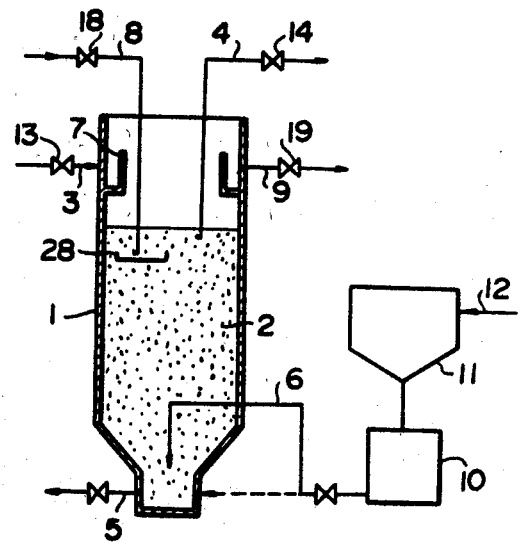
FIG. 4 is a sectional side view showing yet another embodiment of the apparatus of this invention.
Figure 5:
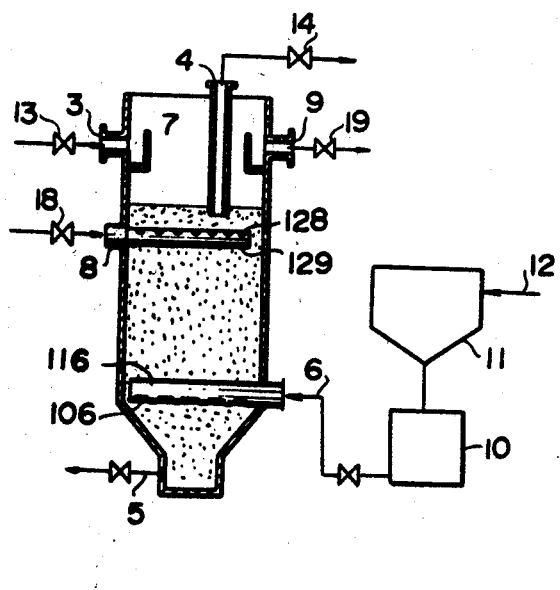
FIG. 5 is a sectional side view showing still another embodiment of the apparatus of this invention.

In FIGS. 1, 4 and 5, reference numeral 12 denotes an active carbon feed line and numerals 13, 14, 15 and 16 are valves in various conduits for controlling flow therethrough.

A fluid containing substance to be adsorbed is introduced into the upper portion of the tank 1 from entrance port or tube 3, and is passed downwardly through the active carbon bed 2. During this passage contaminants in the fluid are adsorbed and removed from the fluid by the active carbon, and the treated and purified fluid leaves tank 1 through discharge tube 5. As the above operation is continued, the upper portion of the active carbon layer 2 adsorbs various substances and is finally saturated with these adsorbed substances. Further, suspended solids contained in the fluid to be treated are trapped on the upper portion of the active carbon bed 2, acting as a filter. As a result, jamming is caused in the upper portion of the active carbon layer 2, and the resistance to passage of fluid increases and the adsorbing activity of the active carbon in the remainder of the bed is reduced. To overcome this difficulty, the used active carbon present in the upper portion of the active carbon bed is withdrawn from tank 1. This withdrawal is accomplished in the following manner.

Introduction of the fluid to be treated is stopped and discharge tube 5 for the treated fluid is closed as by use of valve 15. Simultaneously, valve 14 in discharge tube 4 is opened and active carbon slurried with water in the introduction device 10 is introduced under pressure into the lower portion of the active carbon bed 2 through feed tube 6. By this introduction of the active carbon slurry, the active carbon layer 2 moves upwardly in the tank 1 by a distance corresponding to the amount of the active carbon slurry introduced under pressure into the lower portion of the layer 2; also, the upper portion of layer 2 is fluidized and active carbon present in the upper portion of bed 2 is expelled through discharge tube 4 in the slurry state in an amount substantially equal to the amount of the active carbon slurry introduced through feed tube 6. The solids trapped on the upper portion of the active carbon bed are discharged together with the active carbon slurry through discharge tube 4.

It is important to note that by controlling the rate at which water is introduced into the bottom of the bed within limits which will be presented below, the bed can be lifted as a unit, i.e., piston-wise. This lifting of the bed without fluidizing or slurrying same (except for the very top portion to be removed through discharge tube 4) may also be termed "slugging".

When it is desired to discharge used active carbon without supply of fresh or regenerated active carbon, since the total cross-sectional area of the discharge tube 4 is much smaller than the cross-section area of the tank 1, if a fluid to be treated is supplied through port 3 while keeping the valves 15 and 16 closed and valve 14 of discharge tube 4 is opened, fluidization of used active carbon is readily caused in the interior of discharge tube 4 and the used active carbon present above the open end of discharge tube 4 is expelled from the tank 1 in the slurry state.

After completion of the discharge of the used active carbon at the top of bed 2, with or without replacement of used active carbon with fresh or regenerated active carbon, the adsorption treatment of a fluid to be treated may be resumed.

Preferably, the amount of active carbon to be introduced into the lower portion of tank 1 should be so controlled as to maintain the height of the active carbon layer 2 at a constant level determined experimentally or theoretically to be optimum. Moreover, from the industrial and economical viewpoints it is advantageous that the used active carbon thus discharged out of the tank 1 is then fed to a conventional regeneration step and the regenerated carbon is used for the adsorption treatment repeatedly.

The embodiment of the apparatus shown in FIG. 4 comprises, in addition to members shown in FIG. 1, a liquid-feed tube 8 for back-washing water and a back-washing water discharge tube 9 which are disposed in the upper portion of the tank 1. In the apparatus shown in FIG. 4, the feed tube 3 for charging a fluid to be treated into the tank 1 is connected to the interior of same through a water-gathering device 7 disposed around the inner periphery of the tank 1. This water-gathering device 7 is so constructed that at the time of back washing, back-washing water introduced under pressure from the liquid-feed tube 8 for back-washing water is forwarded together with floatages including solids caught by the active carbon layer 2 toward the back-washing discharge tube 4 which is fitted with valve 14.

Figure 6:
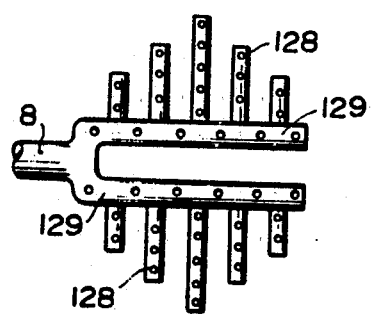
FIG. 6 is a plan view of a horizontal perforated tube for introduction of back-washing water into a tank.

This liquid-feed tube 8 for back-washing water introduces said water into the upper portion of the active carbon bed 2. It is preferred that this end portion of the tube 8 be open so that water under pressure can be upwardly projected as by deflector 28 (see FIG. 4). The water enters at high velocity to fluidize the active carbon above the deflector 28. In a preferred embodiment as shown in FIG. 5, the portion of the tube 8 inside the tank 1 is formed into a horizontal tube 129 having a number of apertures 128 on the upper side thereof. If desired, the portion of tube 8 inside tank 1 may be in the form of a plurality of horizontal tubes 129 as best seen in FIG. 6. By means of such a perforated tube or tubes, the upper portion of the active carbon bed 2 may be fluidized by water projected upwardly at sufficiently high velocity from the deflector 28 or apertures 128, and floatages physically deposited in the bed 2 are washed away.

Further as to the water-gathering device 7, there can be employed a customary gutter or a perforated tube. It is preferred that this water-gathering device 7 be disposed in the tank 1 at such a position that it is sufficiently separated from the surface portion of the active carbon bed 2 so that the active carbon bed 2 is not introduced into the watergathering device by swelling of the bed during back-washing.

Figure 8:
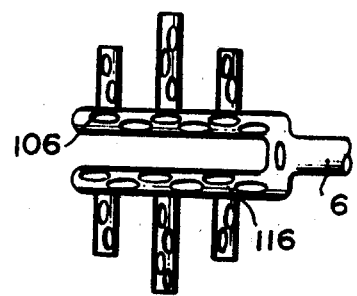
FIG. 8 is a bottom view of a perforated horizontal tube for introduction of active carbon slurry into a tank.

Instead of the active carbon distribution device 17, the portion of the feed tube 6 inside the tank 1 may be formed into a horizontal tube 116 (FIG. 5) having a plurality of apertures 106 on the lower side thereof. Horizontal tube 116 may be divided into a plurality of branch tubes as shown in FIG. 8. In this case, the apertures 106 have a diameter sufficiently larger than the particle size of the active carbon used so that the carbon particles may pass readily therethrough.

In the drawings, numerals 18 and 19 denote valves.

In the above structure, a fluid to be treated is introduced into the upper portion of tank 1 from feed tube 3 disposed in the upper portion of the tank 1, and is caused to pass downwardly through the active carbon layer 2 uniformly. As aforenoted, during this passage, substances to be adsorbed which are contained in the fluid to be treated are adsorbed and removed by the bed of active carbon. Also, as aforenoted, the upper portion of the active carbon layer 2 becomes saturated with adsorbed substances, and suspended solids contained in the fluid to be treated are trapped on the upper portion of the active carbon bed 2.

To return the bed to full or nearly full efficiency, the bed may be back-washed, instead of removing the top portion thereof as previously described. This back-washing is accomplished by projecting back-washing water from liquid-feed tube 8 for back-washing water and washing the active carbon present in the upper portion of the active carbon layer 2 by projected water. It is preferred that the speed of back-washing water be so determined as to fluidize at least the active carbon layer present above the open end portion or deflector 28 of the feed tube 8.

The back-washing discharge water containing large quantities of suspended solids is collected by the water-gathering device 7 disposed in the upper portion of the tank 1 and discharged outside the tank 1 through the back-washing discharge tube 9 and valve 19 in open condition.

Figure 7:
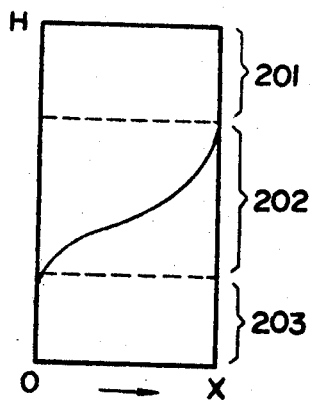
FIG. 7 is a diagram illustrating the adsorption as a function of height in the active carbon bed.

At the start of this back-washing operation, the active carbon bed 2 includes a top portion 201 (FIG. 7) saturated with adsorbed substances, an intermediate portion 202 containing adsorbed substances in quantity decreasing with distance from portion 201 and a bottom portion 203 free of adsorbed substances. The abscissa X represents the concentration of adsorbate on the active carbon. Even if the upper saturated portion 201 is fluidized by back-washing water, the portion 202 positioned below the portion 201 is essentially undisturbed and the major portion of solids caught on the upper portion can be effectively removed.

Fresh or regenerated active carbon stored in the hopper 11 is fed intermittently into the tank 1 in the slurry state from the flow-in tube 6 by means of the introduction device 10. It is preferred that the active carbon slurry be fed at such a speed that fresh or regenerated active carbon is fed to the lower portion of the active carbon layer 2 without disturbing the active carbon layer 2. Introduction of fresh or regenerated active carbon is carried out at a frequency of about once per day to about once per week (the time required for introduction of fresh or regenerated active carbon is about several minutes), the frequency of introduction of active carbon being varied in accordance with the impurity content of the fluid to be treated.

Even if back-washing water is introduced at a low rate so that fluidization in the interior of the tank does not occur, or if a fresh or regenerated active carbon slurry is fed while keeping valves other than the valve 14 of the flow-out tube 4 in the closed state and the valve 14 of the flow-out tube 4 opened, then, nevertheless, fluidization is readily caused in the flow-out tube 4, because of its relatively small crosssectional area, and the used active carbon present above the open end portion of the flow-out tube 4 is effectively slurried and discharged from the system. The introduction of a fluid to be treated to undergo adsorption and filtering treatment can then be resumed.

In the foregoing embodiments of this invention, the kind of active carbon to be used is not particularly critical, but usually commercially available powdery or granular active carbon that has not been subjected to a special chemical or physical treatment can be used.

In this invention, a fluid to be treated is passed downwardly through an active carbon bed in a tank and treated fluid is discharged from the lower portion of the tank. In contrast, active carbon is upwardly moved in the tank to have a counter-current contact with the downward flow of the fluid, whereby solids contained in the fluid are effectively caught on the upper portion of the active carbon layer and discharged without causing substantial disturbance in the adsorption zone at the time of introduction of fresh or regenerated active carbon, withdrawal of used active carbon or back-washing. Since the fluid to be treated is caused to have a counter-current contact with active carbon and is passed through the tank downwardly, the adsorption treatment can be performed as effectively as in the fixed bed type method, and it is possible to adopt a continuous constant operation system. Still further, no difficulty is caused by the change in the feed rate of the fluid to be treated, and it is possible to adjust the feed rate of fresh or regenerated active carbon appropriately depending on the change in the feed rate of the fluid to be treated, whereby the quality of the treated fluid can be maintained at a substantially constant level. Supply of fresh or regenerated active carbon and withdrawal of used active carbon can be performed simultaneously or independently, and the time required for this supply or withdrawal is generally about 5 minutes or less. Accordingly the stoppage of operation of the apparatus is only for supply of fresh or regenerated active carbon and withdrawal of used active carbon, resulting in increase of the operation efficiency of the apparatus. Moreover, back-washing can be freely conducted and air-washing can be done according to need, resulting in a high improvement of the washing effect. In addition, particulate matter floatages and slimes present in the vicinity of the surface portion of the active carbon layer can be removed simultaneously with supply and withdrawal of active carbon.

In order to obtain the high efficiency of true counter-current operation, it is critical, as aforenoted, that the introduction of fresh or regenerated active carbon be carried out under conditions such that the bed is lifted pistonwise, and without causing fluidization, except in the portion of the bed immediately adjacent the top surface 24 of bed 2. Tests have shown that a number of critical conditions must be met if the bed is to be slugged without fluidization.

In determining the critical values of the variables involved in slugging the bed rather than fluidization of same, water was projected upwardly through the bed by passage through valve 21, inlet port 22 and perforated plate 23 as shown in FIG. 9. The velocity of the water was gradually increased until it reached 0.15 m/min at section A—A. At this velocity the packed bed began upward movement as a unit while expanding slightly. The velocity of the water was increased gradually, the degree of expansion of the packed bed increasing with increase in the velocity of the water, until a flow velocity of about 0.3 m/min at section A—A was reached, at which point complete fluidization of the bed occurred. As is evident, then, for the bed under test, slugging could be obtained in the range from about 0.15 to about 0.29 m/min for the water flow velocity at section A—A.

Since the cross-sectional area of frustoconical portion of tank 1 decreases in a downward direction, the flow velocity of liquid passing through same must be higher at section B—B, the bottom of the frustoconical portion than it is at A—A. Conveniently, irrespective of the cross-sectional area at A—A, it is desirable that the range of the ratio $$V_B/V_A = 7 - 60.$$

From this preferred range of flow velocity at the ends of the frustoconical section 26, the ratio of the areas at said ends can be calculated. Again, it is preferred that $$A_B/A_A = 0.017 - 0.143$$

where $A_A$ and $A_B$ are the respective areas at sections A—A and B—B.

Similarly, where the tank is cylindrical, the diameters $B_A$ and $B_B$ preferably have the following relation, $$D_B/D_A = 0.13 - 0.38.$$

A second factor which must be taken into account is the relationship between the height $L_A$ of the packed bed as indicated in FIG. 9 and the wetted perimeter of a section through the bed. This wetted perimeter $L_p$ is the familiar term used in the calculation of the Reynolds number, the term being significant for non-cylindrical conduit. For a cylindrical conduit or vessel, $L_p = \pi D_A$ and for a tank of rectangular shape, $L_p = 2(a + b)$, the length of the sides being $a$ and $b$.

As the velocity of liquid flowing through the bed in an upward direction is increased, the height of the packed bed gradually increases, as aforenoted. Slugging is initiated when the bed exceeds a certain height, this height being related to the wetted perimeter, $L_p$. For water, which is the liquid of interest in the present case, slugging occurs smoothly only when the ratio of $L_A$ to $L_p$ is between 0.32 and 1.12. In other words, $$L_A/L_p = 0.32 - 1.12.$$

For a cylindrical tank, the above equation becomes, $$L_A = (1.0 - 3.5) D_A.$$

The effect of the angle 28 of the frustoconical portion 26 of the tank was also studied. It was found that slugging occurs most reliably when said angle 28 lies between 45° and 90°. From simple trigonometric considerations, it follows that, $$L_B = (0.4 - 1.0) D_A.$$

Figure 10B:
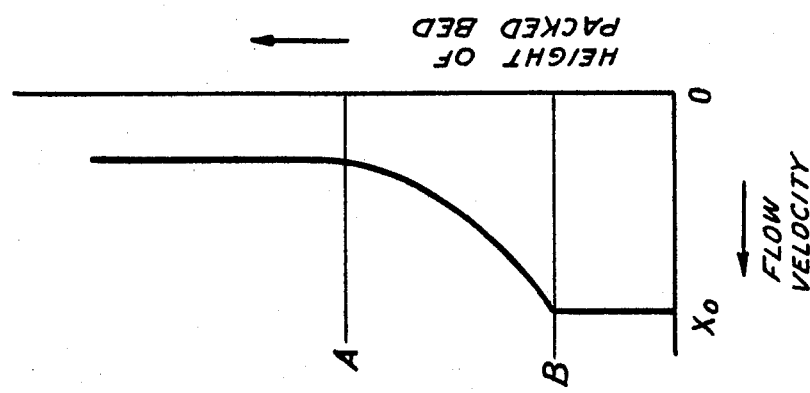
FIGS. 10a and 10b show liquid velocity as a function of height in the active carbon bed.
Figure 10A:
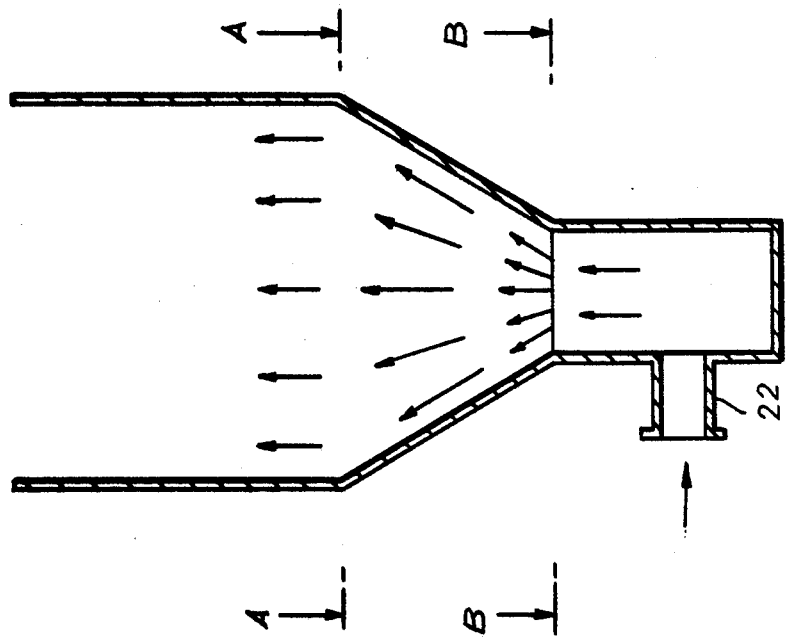

As will be evident, the limiting fluid velocity for slugging is set by conditions within the section of the tank 1 indicated by the reference character $L_A$. The fluid velocity within the frustoconical section will be substantially greater, FIG. 10a indicating the direction of fluid flow through the frustoconical and cylindrical portions of the tank, and FIG. 10b indicating the flow velocity in the different portions of the tank. The flow velocity may substantially exceed the fluidization velocity in the frustoconical section of the tank but fluidization cannot occur therein due to the weight of packed bed in section $L_A$, so long as the limiting slugging velocity is not exceeded in the latter section.

Summarizing the critical conditions for slugging, then, these are, for a cylindrical tank
$D_B = (0.13 - 0.38) D_A$,
$L_A = (1.0 - 3.5) D_A$, and
$L_B = (0.4 - 1.0) D_A$.
$V_A = (0.15 - 0.30)$ m/min.

It is anticipated that these critical conditions may vary somewhat with factors such as the particle size and apparent density of the active carbon.

The sequence of steps for adding active carbon to the bed is initiated by cutting off the feed of raw water to be treated and opening overflow valve 19 (FIG. 9). Water for lifting the packed bed is then introduced through fluid feed-pipe 22 in quantity such that the rate of flow at section A—A lies between 0.15 and 0.30 m$^3$/m$^2$/min and in the range of 2.0 - 10 m$^3$/m$^2$/min in section B—B of FIG. 9. As will be evident, the sequence of ratios, m$^3$/m$^2$/min is equivalent to m/min.

Although fluidization begins when the flow velocity at section A—A reaches or exceeds 0.3 m/min, nevertheless, fluidization does not occur instantaneously when the velocity at section A—A reaches the maximum specified. Accordingly, for the short period of time required for lifting the bed and injecting fresh or regenerated active carbon, a velocity as high as 0.3 m/min$^3$ at the A—A section and 10 m/min at the B—B section can be tolerated. Preferably, the maximum velocity at A—A should be about 0.29 m/min.

The situation in the tank 1 after stopping the feed of waste water is indicated schematically in FIG. 11a. The injection of water through port 22 lifts the bed in the slugging mode and provides space indicated by the reference numeral 31 within section 26 of the tank. At this point, it is preferable that the rate of flow of the liquid used to lift the bed be held in the range of 0.04 to 0.08 m$^3$/m$^2$/min at the A—A section and in the range of 0.50 - 2.70 m$^3$/m$^2$/min at the B—B section.

The replenishment carbon can then be injected through conduit 6 into space 31, the carbon itself being indicated by the reference numeral 32 in FIG. 11c. The fluid injected with the carbon then assists in supporting the bed.

When the requisite quantity of carbon has been added to section 26, the flow of lifting fluid and carbon slurry is stopped and the bed is allowed to drop back into its original position. At this point it is convenient to introduce waste water through port 3, keeping exit valve 15 closed and valve 14 open to slurry the carbon at the top of the bed and remove same through conduit 4 of FIG. 1, 4 or 5 or conduit 9 of FIG. 9. Valve 15 can then be opened and processing of raw water started once more. The quantity of waste carbon removed from the top of the bed should equal that of fresh carbon introduced at the bottom.

This invention will now be illustrated in detail by reference to the following Examples:

EXAMPLE 1

Granular active carbon of 8 to 40 mesh was packed in the slurry state in a columnar tank of this invention having a diameter of 800 mm, the active carbon being introduced through the lower portion of the column by means of an injector so that the pack height was 6000 mm. The entire system was closed, and fluid was fed from the step of the secondary treatment of sewage into the column through the upper portion thereof and the active carbon-treated fluid was discharged from the lower portion of the column. The fluid introduced into this column had a COD (chemical oxygen demand) value of 10 ppm, and it was filtered at a space velocity (SV) of 2 hr$^{-1}$. Space velocity is defined as (volume of liquid) / (volume of bed × hours).

Fresh granular active carbon was intermittently fed once per day by means of an ejector from an introduction device during which introduction of the fluid was stopped. Once per week, a flow-in valve for the untreated fluid and a flow-out valve for used active carbon were opened while keeping other valves in the closed state, used active carbon was removed in the slurry state in an amount corresponding to the amount of the above supplied fresh active carbon. Further, back washing was conducted once per day by feeding water at a rate of 0.25 m³/min for 5 minutes.

Separately, the same fluid fed from the secondary treatment step was fed to a conventional packed type adsorption column filled with the same amount of active carbon at the same space velocity (the column diameter being 1130 mm and the pack height being 3000 mm).

Operation results attained in the above two adsorption systems are as shown in Table 1.

TABLE 1

|  | Method of this invention | Conventional method |
|---|---|---|
| COD of Untreated Fluid | 10 ppm | 10 ppm |
| Fluid Feed Conditions |  |  |
| LV | 12 m/hr | 6 m/hr |
| SV | 2 hr$^{-1}$ | 2 hr$^{-1}$ |
| Properties of Treated Fluid |  |  |
| COD | 2 ppm | 4 ppm |
| COD removal ratio | 80% | 60% |
| Quantity of Active Carbon Supplied | 0.015 m³ a day | 3 m³/200 days |

EXAMPLE 2

A fluid fed from the step of the secondary treatment of waste water discharged at the step of washing soft-drink bottles was treated in the same active carbon adsorption treatment apparatus of this invention as described in Example 1.

In the same manner as described in Example 1, fresh active carbon was introduced once per day and simultaneously, a corresponding amount of used active carbon was withdrawn from the upper portion of the active carbon bed. Back-washing was conducted once per day.

The comparative experiment was similarly conducted by using the same conventional active carbon packed column as described in Example 1.

Operation results are as shown in Table 2.

TABLE 2

|  | Method of this invention | Conventional method |
|---|---|---|
| COD of Untreated Water | 20 ppm | 20 ppm |
| Water Feed Conditions |  |  |
| LV | 30 m/min | 15 m/min |
| SV | 5 hr$^{-1}$ | 5 hr$^{-1}$ |
| Properties of Treated Water |  |  |
| COD | 2 ppm | 6 ppm |
| COD removal ratio | 90% | 70% |
| Quantity of Active Carbon Supplied | 0.2 m³/week | 3 m³/83 days |

EXAMPLE 3

A fluid fed from the step of the secondary treatment of waste water in a chemical plant was treated by the same apparatus as described in Example 1. Active carbon was supplied and discharged once per day. The floatages caught on the surface portion of the active carbon layer were removed from the tank by overflowing simultaneously with the withdrawal of used active carbon.

Since used active carbon was withdrawn once per day, it was unnecessary to perform back-washing in addition.

The comparative test was conducted by using the same conventional active carbon packed column as described in Example 1.

Operation results are as shown in Table 3.

TABLE 3

|  | Method of this invention | Conventional method |
|---|---|---|
| COD of Untreated Water | 50 ppm | 50 ppm |
| Water Feed Conditions |  |  |
| LV | 12 m/hr | 6 m/hr |
| SV | 2 hr$^{-1}$ | 2 hr$^{-1}$ |
| Properties of Treated Water |  |  |
| COD | 10 ppm | 20 ppm |
| COD removal ratio | 80% | 60% |
| Amount of Active Carbon Supplied | 0.072 m³/day | 3 m³/42 days |

The results of these tests show conclusively the advantages of the present invention both as to method and apparatus over the prior methods and apparatus so far as extent of purification is concerned. Moreover, the down time for the apparatus of the present invention is extremely small relative to the time on stream since removal of the top portion of the active carbon bed takes only a few minutes per day. In contrast, where an entire bed must be removed as in conventional apparatus, the interruption involved is far longer. A further point is the advantage accruing from introduction and removal of portions of the active carbon bed as a slurry as disclosed herein.

It may reasonably be asserted, in view of the relatively short hiatus in the operation for replenishment of the bed portionwise, that the present process may be termed "essentially continuous".

An overview of the adsorption tank and the auxiliary equipment used in the process of the present invention is shown in FIG. 12.

It will thus be seen that the objects set forth above, among those made apparent from the preceding description, are efficiently attained and, since certain changes may be made in carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which as a matter of language, might be said to fall therebetween.

What is claimed is:

1. A method for purifying water or waste water fluid by passing it through a packed bed of active carbon, said packed bed being contained in a tank including an upper columnar section and a lower frustoconical section, comprising the steps of:
   (1) supplying said fluid to the upper side of said packed bed, allowing the fluid to flow downwardly through the packed bed, and to leave said bed proximate the lower portion thereof;
   (2) preparing a slurry of active carbon by mixing active carbon with a liquid;
   (3) periodically interrupting the supply of said fluid to the upper side of said bed and lifting said bed in piston-like fashion by the injection of water at a controlled rate beneath said bed, said water being injected at the region of substantially smallest cross-sectional area of said lower frustoconical section of said tank;
   (4) supplying the active carbon slurry periodically into the space beneath said packed bed, said space being formed by lifting said bed;

(5) periodically slurrying the upper portion of the packed bed; and (6) periodically withdrawing the active carbon slurry formed from the upper portion of the packed bed in an amount corresponding to the amount of the active carbon slurry supplied to the lower portion of the packed layer.

whereby the active carbon constituting the packed bed is intermittently moved upwardly counter-current to the fluid and the active carbon is caused to have a counter-current contact with the fluid, for purposes of purification of said water or waste water by adsorption and filtration.

2. The method as defined in claim 1, wherein in the lifting of said bed the rate of flow of water at the top of said frustoconical section is between 0.15 and 0.3 $m^3/m^2/min$ and at the bottom of said frustoconical section is between 2.0 and 10.0 $m^3/m^2/min$.

3. The method as defined in claim 1, wherein in the lifting of said bed the rate of flow of said water at the top of said frustoconical section is between 0.15 and 0.29 $m^3/m^2/min$ and at the bottom of said frustoconical section is between 2.0 and 10.0 $m^3/m^2/min$.

4. The method as defined in claim 1, wherein the rate of injection of said fluid during injection of carbon slurry is between 0.04 and 0.08 $m^3/m^2/min$ at the top of said frustoconical section and between 0.50 and 2.70 $m^3/m^2/min$ at the bottom of said frustoconical section.

5. The method as defined in claim 3, wherein the rate of injection of said fluid during injection of carbon slurry is between 0.04 and 0.08 $m^3/m^2/min$, at the top of said frustoconical section and between 0.50 and 2.70 $m^3/m^2/min$ at the bottom of said frustoconical section.

6. The method as defined in claim 1, wherein the ratio of the length of packed bed in said columnar section to the diameter of said columnar section lies between 1.0 and 3.5.

7. An apparatus for the purification of water or waste water fluid comprising a tank, a packed bed of active carbon held in said tank, said tank having a frustoconical section and a columnar section thereabove, said apparatus including in the upper portion of the tank at least one means for introducing a fluid to be treated into the tank and means for producing active carbon slurry in the upper part of said tank and for discharging said active carbon slurry from the tank, said apparatus further including in the lower portion of the tank at least one means for discharging treated fluid from the tank, means for periodically lifting said packed bed in said tank in piston-like fashion for forming a space free of carbon in said frustoconical section of said tank, said lifting means including means for injecting water from beneath said packed bed at a controlled rate at the region of substantially smallest cross-sectional area of said lower frustoconical section of said tank, and means for periodically introducing replenishment active carbon slurry into said space in said frustoconical section of said tank.

8. An apparatus as defined in claim 7, further including means for introducing back-washing water into said tank and means for discharging back-washing water, both of said back-washing water means being disposed in the upper portion of said tank.

9. An apparatus as defined in claim 8, wherein said apparatus includes water-gathering means, said back-washing water discharge means being connected to the interior of the tank through said water-gathering means.

10. An apparatus as defined in claim 8, wherein said apparatus includes means for uniformly distributing active carbon in slurry form which is disposed proximate the position where the means for introducing the active carbon slurry into said tank is connected to the tank.

11. An apparatus as defined in claim 8, wherein said means for introducing back-washing water includes a member which extends into the tank and has the form of a horizontal conduit defining a plurality of apertures on the upper side thereof.

12. An apparatus as defined in claim 8, wherein the means for introducing the active carbon slurry extends into the tank and has the form of a horizontal conduit defining a plurality of apertures on the downward side thereof.

13. An apparatus as defined in claim 7, wherein said frustoconical section subtends a solid angle between 45° and 90°.

14. An apparatus as defined in claim 7, wherein the ratio of the areas of the top and bottom ends of said frustoconical section lies between 0.13 and 0.38.

15. An apparatus as defined in claim 7, wherein said columnar section is designed to hold a bed having a height $L_A$, said columnar section has an internal perimeter designated as $L_p$ and the range for $$L_A/L_p = (0.32 - 1.12).$$

16. An apparatus as defined in claim 7, wherein the range for the ratio of the bottom diameter $D_B$ of said frustoconical section to the top diameter $D_A$ thereof is $$D_B/D_A = (0.13 - 0.38)$$

* * * * *